United States Patent [19]

Vassiliou

[11] Patent Number: 4,500,238

[45] Date of Patent: Feb. 19, 1985

[54] HOLLOW WALL ANCHOR

[76] Inventor: Eustathios Vassiliou, 12 S. Townview Ln., Newark, Del. 19711

[21] Appl. No.: 425,057

[22] Filed: Sep. 27, 1982

[51] Int. Cl.³ .............................................. F16B 13/04
[52] U.S. Cl. ....................................... 411/30; 411/61; 411/346
[58] Field of Search .................. 411/57, 61, 29, 30, 411/31, 340, 341, 342, 343, 344, 345, 346

[56] References Cited

U.S. PATENT DOCUMENTS

| | | |
|---|---|---|
| 1,295,734 | 2/1919 | Greubel . |
| 1,336,162 | 4/1920 | Royer et al. . |
| 2,296,046 | 9/1942 | Miller . |
| 2,396,501 | 3/1946 | Gibson . |
| 2,601,803 | 7/1952 | Newman ............................ 411/57 |
| 2,745,308 | 5/1956 | Gisondi . |
| 3,148,579 | 9/1964 | Giovannetti ...................... 411/71 X |
| 3,431,813 | 3/1969 | Johnson . |
| 3,550,499 | 12/1970 | Ellenberger ......................... 411/61 |
| 3,919,916 | 11/1975 | Alexander ............................ 411/29 |
| 4,009,634 | 3/1977 | Barmore . |
| 4,300,865 | 11/1981 | Murray ................................ 411/15 |
| 4,354,782 | 10/1982 | Newport ........................... 411/74 X |

FOREIGN PATENT DOCUMENTS

| | | | |
|---|---|---|---|
| 1219317 | 12/1959 | France ................................ 411/60 |
| 401379 | 1/1943 | Italy .................................. 411/61 |
| 46-17656 | 5/1971 | Japan ................................. 411/57 |
| 711095 | 6/1959 | United Kingdom ................ 411/61 |
| 2027834 | 2/1980 | United Kingdom ................ 411/61 |

Primary Examiner—Thomas J. Holko
Attorney, Agent, or Firm—C. S. Krikelis

[57] ABSTRACT

A fastener useful for securing articles on a hollow wall, made of a thin sheet of metal, shaped as to provide two spreadable pointed thin blades for easy insertion into a wall where after the blades are spread apart by the insertion of a screw to form an anchor resisting withdrawal.

11 Claims, 11 Drawing Figures

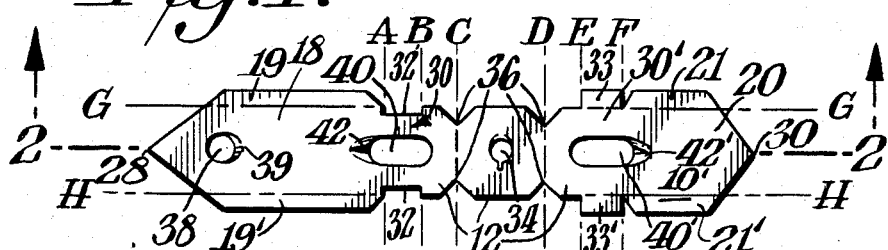
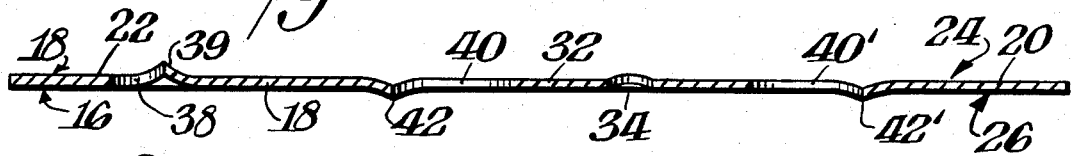
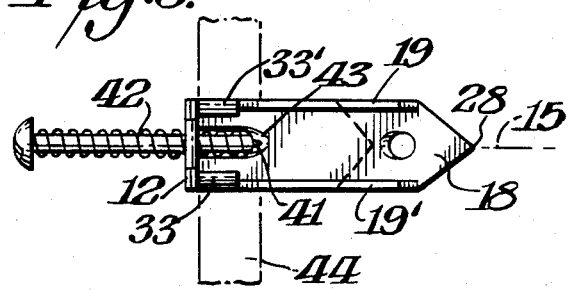
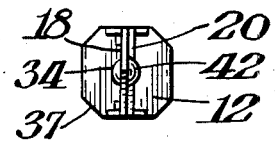
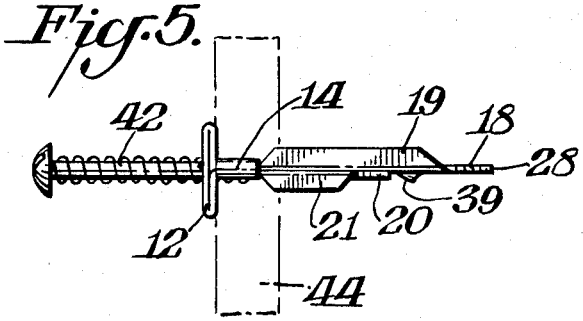
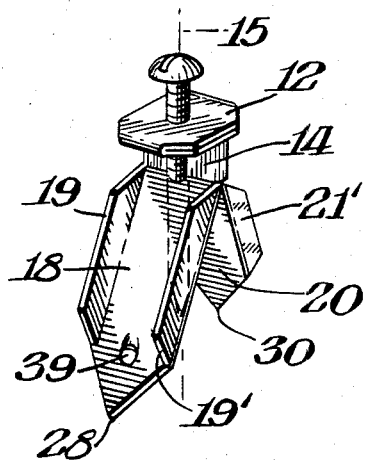
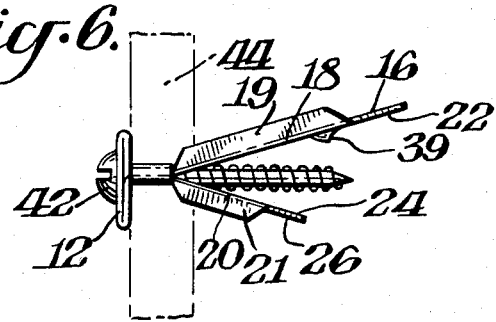

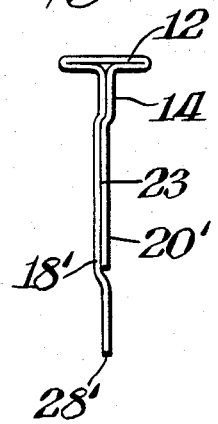
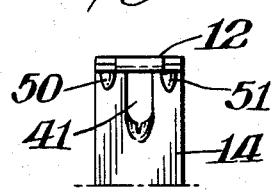
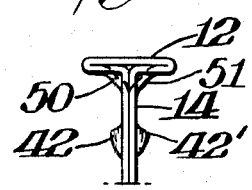
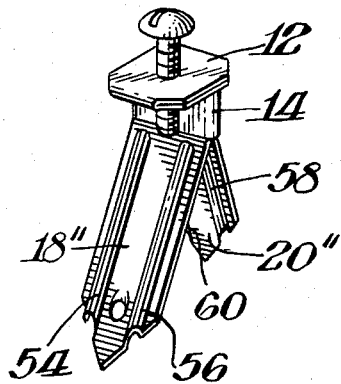

HOLLOW WALL ANCHOR

FIELD OF THE INVENTION

This invention relates to a wall fastener for hollow walls and more particularly to a thin, sheet metal hollow wall fastener for holding articles and the like.

BACKGROUND OF THE INVENTION

A number of fasteners have been used in the past for securing or suspending articles on hollow walls, such as, for example, dry walls or plasterboard walls. These walls are thin and produced out of powdery materials so that conventional fasteners, such as screws, nails, etc. are ineffective in supporting all but the lightest of articles hung on the wall. Through the years, the solution adopted to provide secure support for articles on such hollow walls, has been the use of two part supports comprising a combination anchoring member and a conventional fastening member such as screw or bolt which is secured to the anchoring member, once such member has been inserted in the hollow wall. Typical such fastening members are described in the patent art, exemplified by U.S. Pat. Nos. 1,295,734, 3,431,813, and 4,009,634 among others.

These various fastening members are inserted into the hollow wall usually by first drilling a hole through the wall sufficient to allow for insertion of the enclosing member, and then inserting the anchoring member in the hole. Once the anchoring member is in place, a screw or bolt is employed to either expand a portion of the anchoring member in the wall or to deform the anchoring member so as to provide a back up plate-like arrangement to spread the weight of an article hung on the wall over a larger surface. In both instances, the anchoring member becomes, for all practical purposes, a permanent part of the wall, as removal is difficult and results in damaging the wall.

Recently a variation of the type of fastener shown in U.S. Pat. No. 1,295,734 has appeared, in which the fastener is equipped with a pointed end. Insertion is obtained by simply hammering the fastener into the wall, somewhat similar to a nail. While this method eliminates the extra step of hole drilling, it tends to damage the inner and thus invisible, portion of the wall because of its rather wide cross section. This damage consists of the formation of a crater of unpredictable size around the anchoring member due to crumbling of the wall as the fastening member is forced therethrough. Thus, the wall is weakened in the immediate vicinity where a load will be applied.

Thus, even though there are numerous hollow wall fastening members known, there is still need for an inexpensive such member which will provide a reliable support, easy single step insertion, and be removable with minimal damage to the hollow wall.

SUMMARY OF THE INVENTION

This and other objectives are obtained through the fastening member subject of this invention, which comprises a sheet metal anchor and an elongated fastener, said anchor comprising a generally flat head portion having a hole therethrough, said hole having an axis perpendicular to the head, a generally flat neck portion in a plane perpendicular to said head containing the axis of said hole having an elongated opening extending the full length of the neck along the axis and first and second thin, sheet metal spreadable anchoring blades extending from said neck in the direction of the axis, said blades being coplanar with said neck, each of said blades having an inner and an outer surface, the inner surface of the first blade in close contact with the inner surface of the second blade, at least one of said blades terminating in a point, whereby when the fastener is inserted in the hole the blades are angularly spread apart. In the preferred embodiment, the anchor is a folded unitary sheet metal piece and each blade is ribbed to provide structural strength and resist deformation. In a still more preferred embodiment, the first blade is longer than the second blade and the longer blade includes a protrusion in its inner surface where such surface extends beyond the inner surface of the second blade.

BRIEF DESCRIPTION OF THE DRAWINGS

The invention will be more fully understood from the following detailed description taken in connection with the accompanying drawings which form a part of the application and in which:

FIG. 1 is a plan view of a shaped sheet metal piece which may be folded to produce an anchor in accordance with this invention, FIG. 2 is an enlarged elevation cross-section of FIG. 1 along the line "2—2", FIG. 3 is a plan view of an anchor and fastener in accordance with this invention shown inserted in a hollow wall, FIG. 4 is a bottom view of the anchor, FIG. 5 is an elevation view of the anchor and fastener shown in FIG. 3, FIG. 6 is an elevation view of the fastener shown in FIG. 3, depicting the anchor and fastener of FIG. 3 in the wall after the fastener has been completely inserted, spreading the anchor blades apart, FIG. 7 is a perspective representation of the fastener of FIG. 3 with the blades in the spread position, FIG. 8 is an alternate embodiment of the anchor and fastener in elevation, FIG. 9 is yet an alternate embodiment of the anchor and fastener showing an alternate blade reinforcement, FIG. 10 is a frontal view of the head portion of the anchor showing reinforcing ribs to prevent bending of the head during insertion in the wall and FIG. 11 is an elevation of the reinforced head of FIG. 10.

DETAILED DESCRIPTION OF THE INVENTION

Throughout the following description similar reference numerals refer to similar elements in all figures in the drawings. With reference to FIG. 1 there is shown a piece of thin sheet metal 10 which has been shaped so that following folding along the indicated fold lines will produce an anchor for a fastener in accordance with the preferred embodiment of this invention. Throughout this description when the term thin sheet metal or sheet metal is used it is understood to mean sheet metal varying in thickness between about 0.005 inches (0.0127 cm) to 0.040 inches (0.102 cm). This range of thickness has been selected since it is an object of my invention to avoid the creation of craters in the back portion of the wall into which the fastening member is inserted through hammering, and that a rather small total cross section is necessary for the anchor to be used reliably without damaging that back portion. On the other hand, blades with thickness below 0.005 inches do not provide sufficient structural strength to be driven through the wall without deforming in the process, at least when inexpensive conventional metals are used. Thinner sheet metal may be used if the wall structure is not as strong as the conventional dry walls common in the building trade. In the preferred embodiment it is also desirable that the sheet metal used for producing the anchor be maleable or soft to facilitate the folding process. Once the sheet metal has been folded in the desirable shape, it can then be hardened in a conventional manner to provide additional stiffness and resist deformation during the insertion process.

Referring now to FIG. 1 the sheet metal piece has a first blade portion 18 terminating in a point 28. Proceeding from left to right along FIG. 1 the sheet metal forms a first half of the neck of the anchor 10 which includes symmetrical cut-out sections 32, 32' followed by head portion 12 which includes four "V" shaped cut-outs. After the head, the sheet metal piece includes a section 30' which forms the second half of the neck. This portion 30' includes extended section 33 and 33' dimensioned to fit within cut-outs 32 and 32'. The sheet metal piece terminates into a second blade 20 which ends into a point 30.

Referring to FIG. 2, which shows an elevation cross-section along line "2—2", and FIG. 6, blade 18 is shown as having an inner surface 22 and an outer surface 16 while blade 20 is shown having an inner surface 24 and outer surface 26. Additionally blade 18 is longer than blade 20. The sheet metal piece has a number of punched out holes therein, and during or after the process of punching out the holes, a portion of the sheet metal has been bent in a specific direction, which is important in this embodiment, for reasons to be explained hereinafter.

Near the pointed end of longer blade 18 there is punched a hole 28. As shown in FIGS. 2, 5, and 6, the sheet metal has been deformed in the punching process to produce a raised portion 39 in the inner surface 22, on the side of the hole away from the pointed end of the blade.

Neck portions 30 and 30' include elongated slots 40 and 40'. These slots are of equal size and are both punched so that the end adjacent to the blade portions 18 and 20 respectively is slightly deformed as to form slight protrusions in 42 and 42' on the outer surfaces 16 and 26 of the aforementioned blades. The head 12 also includes a hole 34 punched so as to provide a metal deformation in the direction of the inner surface 22 and 24 as shown in FIG. 2. This deformation is slightly off side and gradually increasing in size so as to form a guide for the thread of a screw used as a fastener with the anchor. The hole 34 has a smaller diameter than the width of slots 40 and 40'.

The sheet metal piece, as shown in FIG. 2 is symmetrical with respect to line "2—2" and all cut-outs are located symmetrically along said line so that when the sheet metal has been properly folded, line "2—2" of FIG. 1 will form an axis 15, as shown in FIGS. 3 and 7 which is perpendicular to the head 12 and in the plane of neck 14. This axis runs through the centerline of cut-out 40 and 40' and the center of hole 34. End points 28 and 30 of the two legs are also located along this axis as well as the centerline of protrusion 39.

The sheet metal piece of FIG. 1 is folded along folding lines A—A, B—B, C—C, D—D, E—E, F—F to form an anchor in the shape shown in FIGS. 3, 4, and 5.

Referring to FIG. 5, the sheet metal has been folded along the aforesaid lines shaping a heat 12. As may better be seen in FIG. 4, the "V" shaped cut-outs 36 have formed, after folding, corner cut-outs 37 to provide an almost rounded shape to the head, and avoid sharp corners which may injure a person handling this device. In addition the cut-outs 36 facilitate the folding process along axes "C—C" and "D—D" by removing a portion of metal in the vicinity of the fold.

Extending perpendicular from head 12 there is neck 14 which is formed from the two halfs 30 and 30', held together in close contact by the folded protrusions 33 and 33' along folding lines "G—G" and "H—H" in the cut-outs 32 and 32'. Following folding, the slots 40 and 40' are aligned along axis 15 to form one slot 41 which extends the full length of the neck 14 and is coaxial with head hole 34. Since the width of slots 40 and 40' was selected bigger than the diameter of hole 34 a screw threaded through hole 34 will pass freely through slot 41. Following folding, the two blades 18 and 20 are brought into intimate contact of their inner surfaces 22 and 24, extending in the plane of neck 14. Where necessary, especially if very thin sheet metal is used, such as 0.005 to 0.015 inch, the two blades may include structural reinforcement by folding a portion 19, 19' and 21 and 21' of blades 18 and 20 respectively along folding lines "G—G" and "H—H' in the direction of outer surfaces 16 and 26.

While none of the dimensions is extremely critical, the overall size should not exceed in practice the usual free space behind hollow walls intended to be used in. Typically length dimensions between 1 and 3 inches are common. Similarly, it is desirable that the length of the neck 14 be about 75% of the thickness of the wall with which a particular fastener is to be used. In this case the blades are spread to form an angle in the range between 30° to 40° which provides satisfactory support. This stiffening members 19, 19', 21 and 21' must also be kept as small as possible, and are normally between 1/64 and ⅛ of an inch. The width of the blades is important in providing adequate anchoring support. Typical widths may vary between about ¼ to about ¾, the length of the longer blade of the anchor. Each blade may terminate to a point using a "V" shaped cut. In that case the angle of the "V" should be as small as possible to facilitate wall penetration. Preferably the angle of the longer blade should be smaller than that of the shorter. Reasonable values are somewhat less than 90° for the longer blade and somewhat above 90° for the shorter.

In operation the anchor is held with the pointed end abutting the wall surface and then hammered into the wall. Once the anchor has been hammered all the way into the wall, the fastening member, such as screw 42 is inserted into hole 34 in the head which has remained outside the wall. As has been pointed before, the sheet metal in the vicinity of hole 34 has been bent downwards to form the beginning of a thread for the fastening member. Thus fastening member 42 will be guided through hole 34 into the neck portion 12 and more particularly the opening created by slots for 42 and 42'. This opening 41, is of larger size than the diamter of the fastening member 42 so that this member will freely move through the neck portion to a point 43 where the slot 41 terminates. As mentioned before, the original sheet metal had been deformed to produce two protrusions 43 and 42' at the bottom end of slot 41. These two protrusions after the folding operation have come together to form a guide for fastening member 42. As fastening member 42 advances past the end of the slot it forces apart blades 18 and 20 as shown in FIG. 6. Thus in one operation the fastening member 42 attaches the anchor to the wall and an article to be supported thereon onto the anchor.

This operation was completed without the need to predrill the wall. If it is desired to remove the anchor from the wall, the fastening member 42 is unscrewed and the anchor is pulled away from the wall. Since the metal that comprises the blades is thin, it bends again readily to its original shape where surfaces 24 and 22 are in contact. It is then easily removed leaving a minimal marking on the wall.

One of the possible problems, particularly noticeable if very thin sheet metal is used for the construction of the anchor, is the possible splitting of the two blades as they are pushed through the wall because of material sliding between the blades and gradually separating them. Thus in a preferred embodiment the metal comprising the longer blade has been deformed somewhat to provide protrusion 39. This protrusion is located just ahead of the point 30 of the shorter blade when the sheet metal piece has been completely folded. Thus as the anchor is hammered into the wall the protrusion moves ahead of point 30 opening so to speak the way for the second blade and thus avoiding the separation of the two blades during the hammering process.

A different way to avoid the separation of the blades is to temporarily hold them together with a coating which provides enough adherence of the two blades to each other but is not strong enough to prevent separation when the screw is inserted thereinbetween. A simple way to obtain this effect is to paint the anchor unit after it has been folded. The paint will form a continuous film which keeps the two blades together during the insertion process. While conventional paints will provide this effect, a more beneficial effect may be obtained using paints of the type called "release" or "non-stick," which provide a very low coefficient of friction; this facilitates the entry of the anchor into the wall.

In order to prevent the head portion from bending during the hammering step which is necessary for insertion of the anchor in the wall, it is desirable to provide some reinforcement at the junction between head and neck, especially when very thin sheet metal is used. This reinforcement as shown in FIGS. 10 and 11 may consist of a small indentation of the sheet metal at the point where it is bent. These indentations not shown in FIG. 1 straddle bending axis "B—B" and "E—E" and may be placed on either side of slots 40 and 40'. After bending, they form generally angular supports 50 and 51 which tend to resist deformation and maintain the head 12 perpendicular to the neck 14.

In FIG. 9 there is shown an alternate arrangement for an anchor which provides a recess 23 in blade 18' into which the second, shorter blade 20' nestles, and is protected during insertion in the wall to prevent separation.

Finally, in FIG. 9 an embodiment of this invention is shown in which blade reinforcement is obtained by stamping a pair of grooves in each blade. The grooves are complementary, that is when the blades are in contact the protruding portion of grooves 58 and 60 fits in the recessed part of grooves 54 and 56.

While most skilled in the art having benefit of the teachings of the instant invention as hereinabove set forth may effect numerous modifications thereto, such modifications are to be construed as lying within the scope of this invention as defined by the following claims:

I claim:

1. A fastening member for a hollow wall comprising a thin sheet-metal anchor having a substantially flat head portion and a hole therethrough, said hole having an axis perpendicular to the head, a substantially flat neck in a plane perpendicular to the head containing the axis, said neck having an elongated opening therethrough the opening extending in the plane of the neck the full length of the neck along the axis and, first and second, thin, flat sheet metal spreadable anchoring blades extending from said neck in the direction of the axis, said blades being coplanar with said neck, each of said blades having an inner and an outer surface, the inner surface of the first blade in close contact with the inner surface of the second blade, at least one of said blades terminating in a point, and a generally elongated fastener having a diameter commensurate with the hole in said head whereby insertion of the fastener in the hole and through the neck spreads the blades angularly.

2. The fastening member of claim 1 in which the anchor comprises a unitary, folded, preshaped sheet metal piece.

3. The anchor of claim 2, in which said blades are of unequal length, one blade being longer than the other, and both terminate in a point.

4. The anchor of claim 2 in which said blades further comprise a portion extending along said blade bent away from said blade plane to provide structural reinforcement.

5. The anchor of claim 2 further comprising at least two angular supports between the head and the neck portions.

6. The anchor of claim 3, in which the longer of the two blades has a protrusion in its inner surface, said protrusion located just ahead of the terminating point of the second, shorter blade.

7. The anchor of claim 4 wherein said blades are channel shaped, each channel facing away from the other.

8. The anchor of any of claims 1, 2, 3, 4, 5, 6 or 7 wherein the hole in said head is shaped to provide a portion of a thread for a threaded fastener and the elongated opening extending the length of the neck is deformed outwardly at the point where the neck terminates and the blades begin, to provide a guide for said threaded fastener.

9. The anchor of any of claims 1, 2, 3, 4, 5, 6 or 7 wherein the anchor has been painted, with a paint film that covers the two blades without a break.

10. The anchor of any of claims 1, 2, 3, 4, 5, 6, or 7 wherein a low strength adhesive has been coated on the inner surface of at least one blade.

11. The anchor of any of claims 2, 3, 4, 5, 6 or 7 wherein said sheet metal has been hardened after folding.

* * * * *